United States Patent [19]

Tamura et al.

[11] Patent Number: 5,077,503
[45] Date of Patent: Dec. 31, 1991

[54] WATER DRAIN DEVICE OF ROTARY ELECTRIC MACHINE

[75] Inventors: Masayuki Tamura; Hiroyuki Shiina, both of Ohta; Yasushi Yoshida, Kiryu, all of Japan

[73] Assignee: Mitsuba Electric Manufacturing Co., Ltd., Gumma, Japan

[21] Appl. No.: 623,173

[22] Filed: Dec. 5, 1990

[30] Foreign Application Priority Data

Dec. 6, 1989 [JP] Japan ............................. 1-141266[U]
Dec. 6, 1989 [JP] Japan ............................. 1-141267[U]

[51] Int. Cl.⁵ .............................................. H02K 5/10
[52] U.S. Cl. ........................................ 310/88; 310/89
[58] Field of Search ................. 310/88, 89, 90; 29/596

[56] References Cited

U.S. PATENT DOCUMENTS

| 4,978,875 | 12/1990 | Okamoto | 310/88 |
| 4,994,699 | 2/1991 | Shina | 310/88 |
| 5,010,265 | 4/1991 | Tanaka et al. | 310/88 |

FOREIGN PATENT DOCUMENTS

| 1321456 | 6/1973 | Canada | 310/88 |
| 62-2906 | 2/1984 | Japan | 310/89 |

Primary Examiner—Steven L. Stephan
Assistant Examiner—D. L. Rebsch
Attorney, Agent, or Firm—McGlew & Tuttle

[57] ABSTRACT

A water drain device of a revolving electric machine, wherein an oil reservoir chamber is formed at a position adjacent a bearing housing chamber in a housing having a rotor housing chamber and the bearing housing chamber, a rotor in the rotor housing chamber is supported by bearings in the bearing housing chambers, and an oil seal in slidable contact with the outer peripheral surface of the rotor is provided at a position adjacent the oil reservoir chamber. In the housing, an oil discharge channel opens in a direction in which gravity drains oil in the oil reservoir chamber out of the housing, a water discharge channel connects the rotor housing chamber and the vicinity of an outlet of the oil discharge channel, and an air vent channel connects the rotor housing chamber to the oil discharge channel through the oil reservoir chamber. A drain cover forming a fluid discharge channel is mounted in the vicinity of the outlet of the oil discharge channel and an outlet of the water discharge channel. The drain cover is inserted into a drain cover mounting groove. At least a pair of baffle plates are provided in a hollow portion of the drain cover.

12 Claims, 3 Drawing Sheets

WATER DRAIN DEVICE OF ROTARY ELECTRIC MACHINE

BACKGROUND OF THE INVENTION

1. Field of the Invention

This invention relates to a water drain device of a revolving electric machine such as an electric motor and a generator.

2. Related Art Statement

In general, in a revolving electric machine such as an electric motor or generator, to prevent water from accumulating in the machine due to moisture condensation and the like, a water drain hole is opened at the bottom of the housing.

Now, for example, with a starter motor and the like mounted on a vehicle such as a motor vehicle, a motor cycle and the like, there are situations cases where the bottom portion of a housing of a revolving electric machine is splashed with water. In such situations, the water reversely intrudes into the housing through a water drain hole, inviting such problems as electric insulation deterioration, corrosion of a conductive portion, lubrication becoming poor in a movable section, and so forth.

Conventionally in the revolving electric machine of the type described, as a means for preventing the water from intruding through the water drain hole opened in the bottom portion of the housing, there has been used a water drain device, to which a tube such as a rubber tube and the like is connected.

On the other hand, in the case of a motor provided with an oil seal, a water drain device is adopted intended to function when immersed in water and an oil drain construction intended to oil at the time of the wear the oil seal and like as described in Japanese Utility Model Unexamined Publication No. 62-198849 for example.

However, in the case of the motor with an oil seal having the conventional oil drain construction and water drain construction, the respective constructions are provided independently of each other, whereby rubber parts and resinous parts are used in the respective constructions, thereby presenting the disadvantages that costs rise and the number of man-hours for assembling is increased.

When only a tube such as a rubber tube is mounted to the water drain hole, the splashed water intrusion preventive effect is low. Therefore, as described in Japanese Utility Model Examined Publications Nos. 62-2905 and 62-2906, such a technique has been proposed that a plurality of baffle plates are projected in the intermediate portion of the tube with a water way being left, whereby a labyrinth is formed, so that the splashed water can be effectively prevented from intruding.

However, when the baffle plates are formed in the intermediate portion of the rubber tube, the baffle plates are formed by a so-called forced extrusion method by utilizing the elasticity of a rubber material at the time of resin molding of the rubber tube, so that allowance of overlap between the baffle plates cannot be set at a large value.

As a result, the splashed water intrusion preventive effect by the baffle plates is limited.

SUMMARY OF THE INVENTION

It is an object of the present invention to provide a water drain device of a revolving electric machine, capable of smoothly performing oil drainage and water drainage even if a waste oil drain construction and a water drain construction are formed integrally with each other.

It is another object of the present invention to provide a water drain device of a revolving electric machine, wherein allowance of overlap between baffle plates can be set at a large value.

According to one aspect of the present invention, the water drain device of a revolving electric machine is provided, wherein, an oil reservoir chamber is formed at a position adjacent a bearing housing chamber in a housing having a rotator housing chamber and the bearing housing chambers;

a rotator in the rotator housing chamber is rotatably supported by bearings in the bearing housing chambers; and an oil seal in slidable contact with the outer peripheral surface of a rotary shaft of the rotator is provided at a position adjacent the oil reservoir chamber, is characterized in that:

in the housing, there are opened an oil discharge channel in a direction in which the gravity acts, the channel introducing oil in the oil reservoir chamber to the outside of the housing;

a water discharge channel connects the rotator housing chamber to the vicinity of an outlet of the oil discharge channel; and an air vent channel connects the rotator housing chamber to the oil discharge channel through the oil reservoir chamber; and a drain cover forming a fluid discharge channel is mounted in the vicinity of the outlet of the oil discharge channel and an outlet of the water discharge channel.

According to the water drain device of a revolving electric machine of the present invention, the oil discharge channel and the water discharge channel are provided at positions close to each other, the oil discharge construction and the water drain construction are formed integrally with each other, and the oil discharge channel is communicated with the water discharge channel through the air vent channel, whereby the pressure in the drain cover and the pressure in the rotator housing chamber are of the same atmospheric pressure, so that oil discharge and water discharge can be performed smoothly.

Furthermore, according to another aspect of the present invention, the water drain device of a revolving electric machine is provided, wherein, a water drain hole is opened at the bottom portion of the housing; and a splashed water intrusion preventive means is mounted at this water drain hole, characterized in that:

a drain cover mounting hole is recessedly provided at the position of an outlet of the water drain hole in the housing so as to be at least communicated with the water drain hole and to be open at the bottom surface;

a drain cover is mounted to the drain cover mounting hole, this drain cover being formed into a channel shape having a hollow portion opened at the top surface, bottom surface and one of the side surfaces thereof; and in the hollow portion of the drain cover, at least a pair of baffle plates are projected inwardly at the right and left side inner wall surfaces positioned at opposite sides of the opened side surface, in such a manner that the positions of the baffle plates are shifted from each other in the vertical direction and the forward end portions of the baffle plates overlap each other.

According to the above-described means, the allowance of overlap between the baffle plates projectingly provided at the right and left side walls can be set at a very large value because the opening at the side surface of the hollow portion is used for withdrawing the drain cover from the mold during the molding of the drain cover. When the allowance of overlap between the baffle plates are set at a large value, the splashed water intrusion preventive effect can be highly improved.

BRIEF DESCRIPTION OF THE DRAWINGS

The above and other objects and features of the present invention will become more apparent when referred to the following descriptions given in conjunction with the accompanying drawings, wherein like reference numerals denote like elements and in which.

DETAILED DESCRIPTION OF THE PREFERRED EMBODIMENTS

Figure 1:
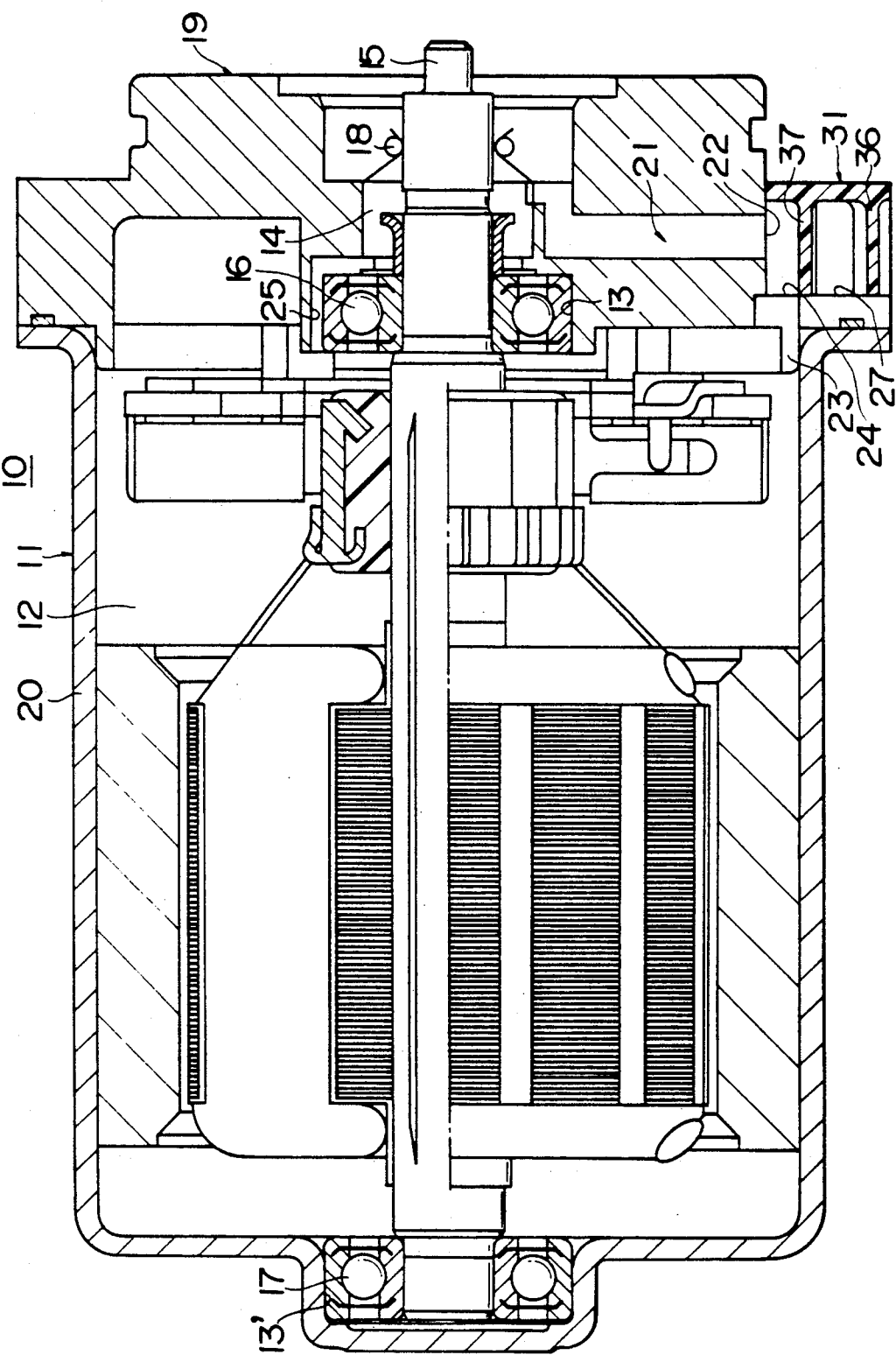
FIG. 1 is a longitudinal sectional view showing one embodiment of the water drain device of a revolving electric machine according to the present invention.
Figure 2:
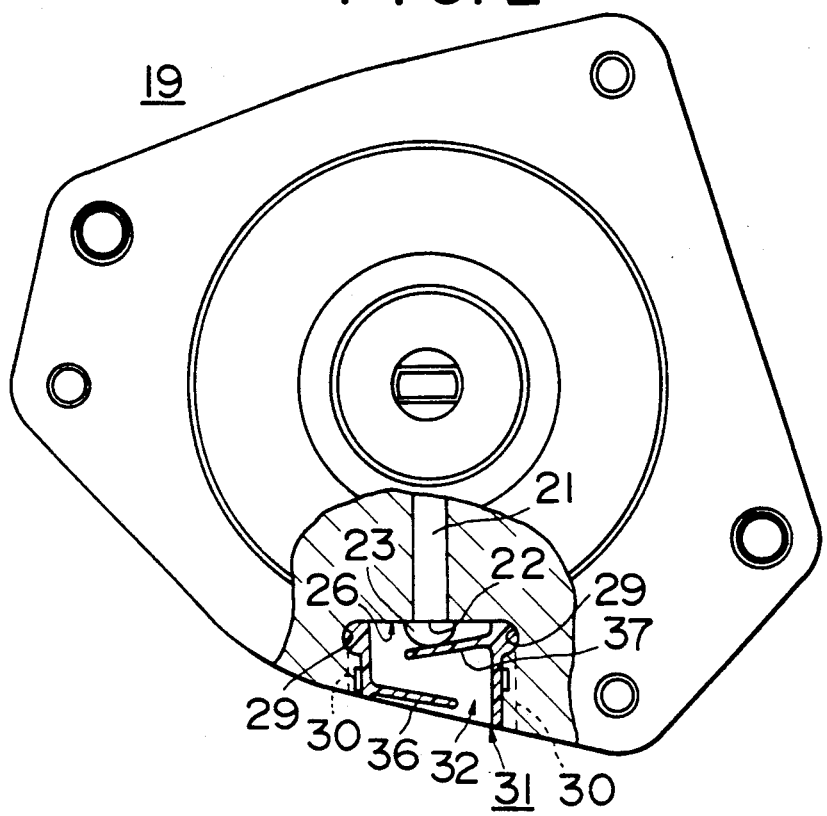
FIG. 2 is a partially sectional front view showing the housing.
Figure 3:
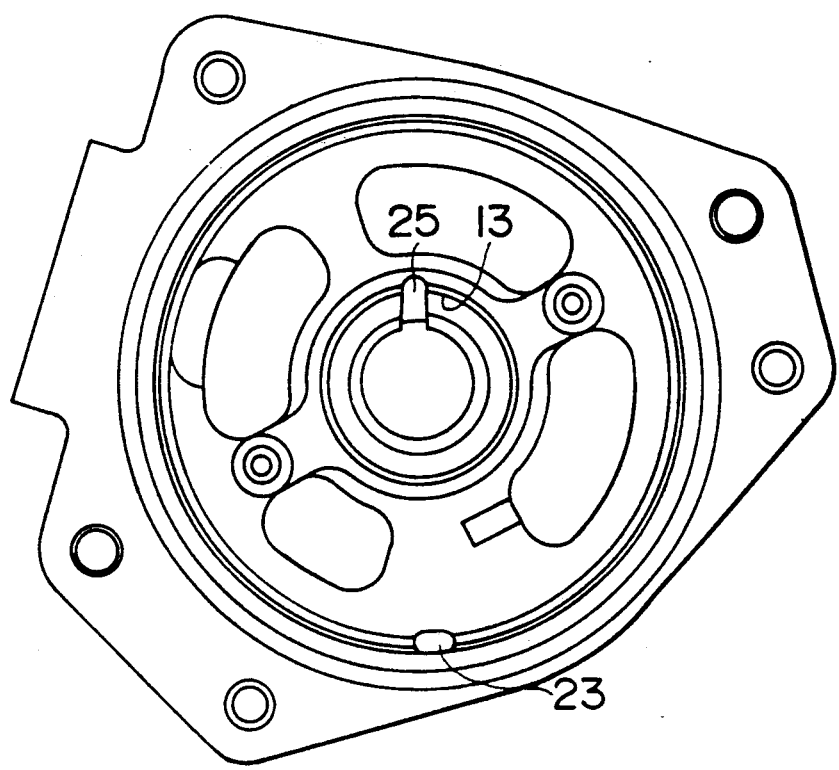
FIG. 3 is a rear view showing the housing.

Referring to the drawings, in this embodiment shown in the drawings, a water drain device of a rotating electric machine according to the present invention is applied to a motor 10 for driving a hydraulic pump, not shown. Formed on a housing 11 incorporating therein a rotor and the like of the motor are a rotor housing chamber 12, bearing housing chambers 13, 13' and an oil reservoir chamber 14. The rotor and the like of the motor 10 are housed in the rotor housing chamber 12. And a rotary shaft 15 is rotatably supported by bearings 16 and 17 in the bearing housing chambers 13 and 13'. The oil reservoir chamber 14 is provided at a position adjacent one end 13 of the bearing housing chambers. An oil seal 18 is provided at a side of the oil reservoir chamber 14 opposite to the bearing housing chamber 13. A portion of the oil seal 18 is in slidable contact with the outer peripheral surface of the rotary shaft 15, so that oil, not shown, is prevented from leaking to the side of the oil reservoir chamber 14. The housing 11 includes a substantially flat plate-shaped end bracket 19 and a cylindrical yoke 20 having one end open and the other end closed. The end bracket 19 covers the open end of the yoke 20 to close it, and is fixed with screw members.

An oil discharge channel 21 for introducing oil leaking into the oil reservoir chamber 14 to the outside downwardly is formed in a wall member of the end bracket 19 in a direction in which gravity acts. More specifically, in the wall member of the end bracket 19, the top end of the oil discharge channel 21 is opened to the bottom portion of the oil reservoir chamber 14 in a manner to be connected from the side of the bearing housing chamber 13, the intermediate portion of the oil discharge channel 21 extends vertically, and the bottom end thereof is vertically downwardly opened at the bottom end position along the outer periphery of the end bracket 19.

Furthermore, opened at an end face of the end bracket 19 exposed to the interior of the rotator housing chamber 12 is a water discharge channel 23 forming a water drain hole for discharging water held in the rotator housing chamber 12. More specifically, the water discharge channel 23 is recessedly provided on the end face at the inner side of the end bracket 19, extending in the axial direction thereof at the bottom end portion of the outer peripheral edge portion. One end of the water discharge channel 23 is opened in a hollow portion of the yoke 20 constituting the rotator housing chamber 12, and the other end thereof is opened to the outer periphery of the end bracket 19. An outlet 24 of this water discharge channel 23 and an outlet 22 of the oil discharge channel 21 are provided at positions close to each other at the bottom end of the outer periphery of the end bracket 19.

Further, on the inner peripheral surface of the bearing housing chamber 13 in the end bracket 19 is provided an air vent channel 25 for communicating the oil discharge channel 21 to the rotator housing channel 12 through the oil reservoir chamber 14. More specifically, the air vent channel 25 is constituted by a recessedly formed gutter extending in the axial direction at the top end position on the inner peripheral surface of the bearing housing chamber 13 and a longitudinal groove recessedly provided and suspending from one end of the gutter at an end face wall of the bearing housing chamber 13. The air vent channel 25 is communicated with the oil reservoir chamber 14 at the lower end of the longitudinal groove, and communicated with the rotator housing chamber 12 at the inner end of the gutter.

A drain cover mounting groove 26, forming part of a drain cover mounting hole, is opened at a position of the end bracket 19 where the outlet 24 of the water discharge channel 23 and the outlet 22 of the oil discharge channel 21 are provided close to each other. A drain cover 31 made of plastic is detachably mounted in the drain cover mounting groove 26.

More specifically, the drain cover mounting groove 26 is provided at the central portion of the bottom end in a front surface of the end bracket 19 and recessedly formed to define a hole being of substantially regular square shape and having a predetermined depth. The front and the bottom of the drain cover mounting groove 26 are opened as a front opening 27 and a bottom opening 28 respectively. The outlet 22 of the oil discharge channel 21 is opened in a ceiling wall of the drain cover mounting groove 26, and the outlet 24 of the water discharge channel 23 is opened in a rear wall just opposed to the front opening 27 of the groove 26. Furthermore, a pair of fall-off preventive or retention grooves 29 and 29 are cut, extending in the back and forth, at the top end portions of right and left side walls of the drain cover mounting groove 26, and a pair of dislodge preventive grooves 30 and 30 are cut, extending vertically, at the intermediate portion of the side walls.

Figure 4:
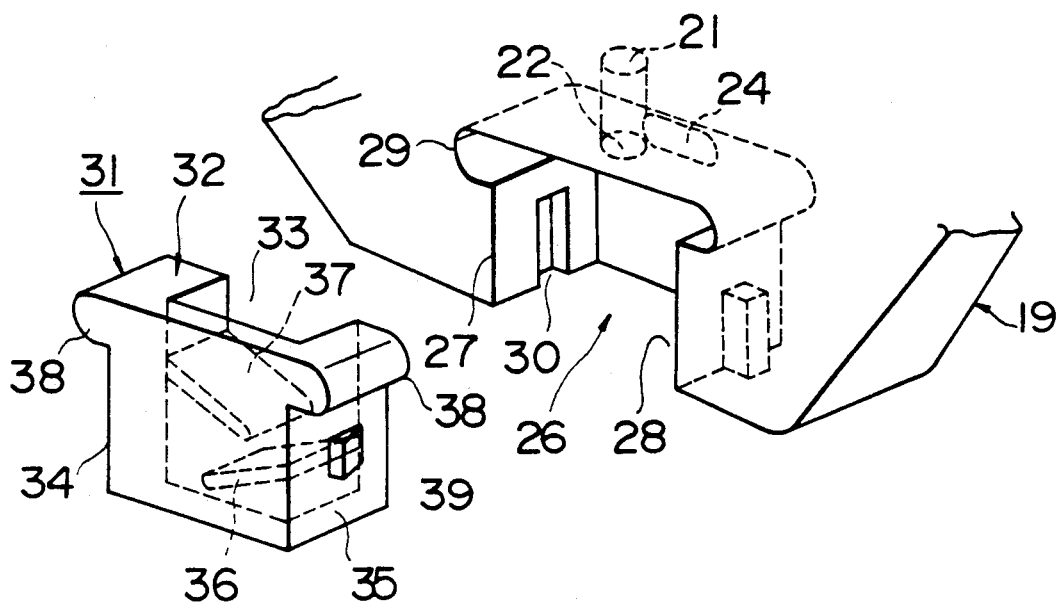
FIG. 4 is a disassembled perspective view showing the principal portions.
Figure 5:
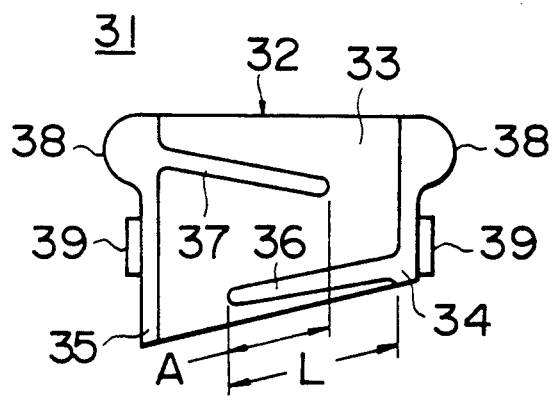
FIG. 5 is a rear view showing the drain cover.
Figure 6:
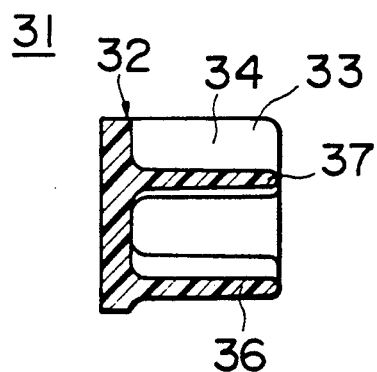
FIG. 6 is a sectional side view showing the drain cover.
Figure 7:
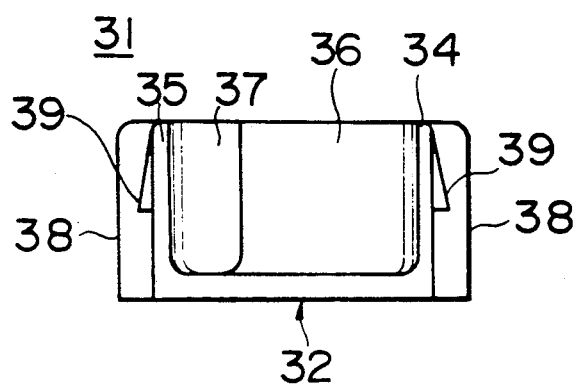
FIG. 7 is a bottom view showing the drain cover.

On the other hand, as shown in FIGS. 4 to 6, the drain cover 31 is formed integrally into a substantially channel-iron-like shape by use of resin or the like. More specifically the drain cover 31 has a main body 32 formed into a channel shape having a front surface shape and an axial depth which are to be coupled into the drain cover mounting groove 26, and a hollow portion 33 of the main body 32 is open at a rear surface, a ceiling surface and a bottom surface thereof, respectively. A pair of baffle plates 36 and 37 are inwardly projectingly provided on the inner surfaces of right and left side walls 34 and 35 of the main body 32 with the forward ends thereof being slightly lowered. The forward ends of the right and left baffle plates 36 and 37 overlap each other, and an overlap allowance A is set at a value of more than ½ of a length L of the baffle plate. The hollow portion 33 of the main body 32 of the drain cover is opened at the rear surface, the direction of which can be used as the direction of withdrawing the main body 32 of the drain cover from a mold, so that the overlap allowance A can be designed at a very large value.

A pair of fall-off preventive portions 38 and 38 are outwardly projected at the top end portions of the outer surfaces of the right and left side walls 34 and 35 of the main body 32 so that the fall-off preventive portions 38 and 38 can be coupled into the fall-off preventive grooves 29 and 29. Further, a pair of dislodge preventive pawls 39 and 39 are outwardly projected at the intermediate portions of the right and left side walls 34 and 35 so that the dislodge preventive pawls 39 and 39 are engageable with the dislodge preventive grooves 30 and 30.

The drain cover 31 thus constructed is inserted into the drain cover mounting groove 26 of the end bracket 19 with the fall-off preventive portions 38 being coupled into the fall-off preventive grooves 29 in a state where the opening is directed inwardly. When the drain cover 31 is inserted into the end of the axial depth, the dislodge pawls 39 and 39 are engaged with the dislodge preventive grooves 30 and 30, respectively, whereby the drain cover 31 is fixedly mounted in the drain cover mounting groove 26.

The outlet 22 of the oil discharge channel 21 and the outlet 24 of the water discharge channel 23, which are opened in the end bracket 19, are simultaneously covered by the drain cover 31 thus mounted in the drain cover mounting groove 26. In this state, the baffle plates 36 and 37 of the drain cover 31 permit oil discharged from the outlet 22 and water discharged from the outlet 24 to flow down, while the splashed water from below can be effectively prevented from intruding.

Operation will hereunder be described.

The overlap allowance A between the baffle plates 36 and 37 is set at a very large value in the state where the drain cover 31 is mounted, so that the splashed water intrusion preventive effect is very high.

When oil is accumulated in the oil reservoir chamber 14 because of, for example, the use of the motor 10, this oil passes through the oil discharge channel 21 and is discharged from the outlet 22 via the drain cover 31 by the action of gravity. Furthermore, water, which has been intruded into the rotator housing chamber 12 due to the condensation and the like, is discharged from the drain cover 31 through the water discharge channel 23.

In these oil discharge and water discharge actions, the oil reservoir chamber 14 and the rotator housing chamber 12 are in communication with each other through the air vent channel 25, and the oil reservoir chamber 14 is in communication with the atmosphere through the oil discharge channel 21, whereby the pressures acting on the oil and the water come to be same as the atmospheric pressure, so that oil discharge and water discharge can be effected smoothly.

Further, the oil drain construction and the water drain construction are formed integrally with each other, whereby the single drain cover 31 can cover both outlets 22 and 24 at the same time, so that the costs and the number of man-hours for assembling work can be reduced accordingly.

The present invention should not necessarily be limited to the above embodiment, and it is needless to say that various modifications can be adopted within the scope of the invention.

For example, the drain cover should not be limited to the use of one having the above-described arrangement.

Further, for example, the drain cover mounting hole should not be limited to the groove shape having the openings at the front surface and bottom surface, and a groove shape, in which the front surface is closed and only the bottom surface is opened, may be adopted. In that case, the drain cover is inserted into the drain cover mounting hole through the opening from below.

Furthermore, the drain cover mounting hole may be associated only with the outlet of the water discharge channel as being the water drain hole.

As has been described hereinabove, according to the present invention, the oil drain construction and the water drain construction are formed integrally with each other, and the oil discharge channel and the water discharge channel are in communication with each other through the oil reservoir chamber, the rotator housing chamber and the air vent channel, whereby the pressures acting on the oil and the water come to be the same as the atmospheric pressure, so that the oil discharge and the water discharge can be effected smoothly, and the costs and the number of man-hours for assembling are reduced.

Furthermore, according to the present invention, the opening in the side surface of the hollow portion of the drain cover is used as the direction of withdrawing the main body of the drain cover from the mold during molding of the drain cover, so that the overlap allowance between the baffle plates which are projected from the right and left side walls can be set at the very large value. When the overlap allowance between the baffle plates is set at very large value, the splashed water intrusion preventive effect of the drain cover becomes very high.

What is claimed is:

1. A water drain device of a revolving electric machine, wherein,
   an oil reservoir chamber is formed at a position adjacent to a bearing housing chamber in a housing having a rotator housing chamber and the bearing housing chambers:
   a rotor in the rotator housing chamber is rotatably supported by bearings in the bearing housing chambers;
   an oil seal in slidable contact with the outer peripheral surface of a rotary shaft of the rotator is provided in at a position adjacent to the oil reservoir chamber;
   an oil discharge channel is provided in the housing open in a direction in which gravity drains, for introducing oil in the oil reservoir chamber to the outside of the housing;
   a water discharge channel is provided in the housing for connecting the rotator housing chamber and vicinity of an outlet of the oil discharge channel;
   an air vent channel is provided in the housing for connecting the rotator housing chamber to the oil discharge channel through the oil reservoir chamber; and a drain cover forming a fluid discharge channel is mounted in the vicinity of the outlet of the oil discharge channel and an outlet of the water discharge channel.

2. A water drain device of a revolving electric machine as set forth in claim 1, wherein:
said oil discharge channel adjoins the oil seal, and is disposed at a position between the oil seal and said bearing in the bearing housing chamber.

3. A water drain device of a revolving electric machine as set forth in claim 1, wherein:
said housing is a yoke of the revolving electric machine, and
said water discharge channel is provided along a bottom wall surface of the yoke.

4. A water drain device of a revolving electric machine as set forth in claim 1, wherein:
said oil discharge channel and said water discharge channel are formed in substantially perpendicularly intersecting direction with each other.

5. A water drain device of a revolving electric machine as set forth in claim 1, wherein:
said air vent channel is provided at a position upwardly of the bearing in the bearing housing chamber.

6. A water drain device of a revolving electric machine as set forth in claim 1, wherein:
said water discharge channel is opened in the bottom portion of the housing,
a drain cover mounting hole is recessedly provided at a position of an outlet of the water discharge channel in the housing so as to be at least communicated with the water discharge channel and to have the bottom surface opened,
a drain cover is mounted to the drain cover mounting hole, said drain cover being formed into a channel shape having a hollow portion opened at the top surface, bottom surface and one of the side surfaces thereof, in said hollow portion,
at least a pair of baffle plates are projected inwardly at positions shifted from each other in the vertical direction on the right and left side inner wall surfaces positioned at opposite sides of the side surface opening with the forward end portions of the baffle plates overlapping each other.

7. A water drain device of a revolving electric machine as set forth in claim 6, wherein:
when said drain cover is mounted to the mounting hole, said side surface opening of the drain cover is closed by the wall surface of the housing so as to form a drain construction.

8. A water drain device of a revolving electric machine as set forth in claim 6, wherein:
said drain cover has fall-off preventive portions for preventing said drain cover from falling off in the vertical direction and dislodge preventive pawls for preventing said drain cover from being dislodged in the horizontal direction.

9. A water drain device of a revolving electric machine as set forth in claim 8, wherein:
said fall-off preventive portions are coupled into fall-off preventive grooves in the drain cover mounting hole in a state where said drain cover is inserted into said drain cover mounting hole, and
said dislodge preventive pawls are engaged with dislodge preventive grooves in said drain cover mounting hole in a state where said drain cover is inserted into the bottom of the axial depth of said drain cover mounting hole.

10. A water drain device of a revolving electric machine as set forth in claim 6, wherein:
said drain cover is made of resin.

11. A water drain device of revolving electric machine as set forth in claim 6, wherein:
said overlap allowance between the baffle plates is more than $\frac{1}{2}$ of the length of the baffle plate.

12. A water drain device of a revolving electric machine as set forth in claim 6, wherein:
only one pair of baffle plates are used.

* * * * *